(12) United States Patent
Gibso et al.

(10) Patent No.: US 11,348,106 B2
(45) Date of Patent: May 31, 2022

(54) VEHICLE REFUELING AUTHENTICATION SYSTEM

(71) Applicants: Hod Gibso, Ramat Hasharon (IL); Shiran Shlafrok, Ramat Hasharon (IL); Zion Ginat, Tel Aviv (IL)

(72) Inventors: Hod Gibso, Ramat Hasharon (IL); Shiran Shlafrok, Ramat Hasharon (IL); Zion Ginat, Tel Aviv (IL)

(*) Notice: Subject to any disclaimer, the term of this patent is extended or adjusted under 35 U.S.C. 154(b) by 207 days.

(21) Appl. No.: 16/628,584

(22) PCT Filed: Jul. 4, 2018

(86) PCT No.: PCT/IL2018/050729
§ 371 (c)(1),
(2) Date: Jan. 3, 2020

(87) PCT Pub. No.: WO2019/008584
PCT Pub. Date: Jan. 10, 2019

(65) Prior Publication Data
US 2020/0219104 A1 Jul. 9, 2020

(30) Foreign Application Priority Data

Jul. 5, 2017 (IL) .......................................... 253321
Aug. 3, 2017 (IL) .......................................... 253825

(51) Int. Cl.
*G06Q 40/00* (2012.01)
*G06Q 20/40* (2012.01)
(Continued)

(52) U.S. Cl.
CPC ..... *G06Q 20/4014* (2013.01); *G01C 21/3469* (2013.01); *G06Q 20/389* (2013.01); *G06V 30/224* (2022.01)

(58) Field of Classification Search
CPC ..... G06F 16/245; G06F 16/285; G06Q 10/20; G06Q 20/326; G06Q 20/4014
(Continued)

(56) References Cited

U.S. PATENT DOCUMENTS 9,530,064 B2   12/2016   Blumer et al.
9,633,486 B2    4/2017   Leseky et al.
(Continued)

FOREIGN PATENT DOCUMENTS

EP   2528043 A1   11/2012
GB   2523359 A     8/2015
(Continued)

OTHER PUBLICATIONS

Wallet-on-wheels—Using vehicle's identity for secure mobile money; 2013 17th International Conference on Intelligence in Next Generation Networks (ICIN) (pp. 102-109); Rebecca Coneland, Noel Crespi; Oct. 15, 2013 (Year: 2013).*
(Continued)

*Primary Examiner* — Tien C Nguyen
(74) *Attorney, Agent, or Firm* — Nelson Mullins Riley & Scarborough LLP; Andrew W. Schultz

(57) ABSTRACT

The present invention relates to a method for authenticating vehicle service account transactions, in which an odometer of a vehicle is digitally read and during an authentication process the odometer reading is compared to a previous digital reading of the odometer for determining whether the reading relates to an authenticated vehicle and whether the current reading relative to the previous reading justifies servicing the vehicle.

12 Claims, 2 Drawing Sheets

(51) Int. Cl.
*G01C 21/34* (2006.01)
*G06Q 20/38* (2012.01)
*G06V 30/224* (2022.01)

(58) Field of Classification Search
USPC ........ 705/39, 44, 37, 38; 709/227, 217, 218; 726/9, 6; 463/25, 20; 446/268, 431
See application file for complete search history.

(56) References Cited

U.S. PATENT DOCUMENTS

| | | | |
|---|---|---|---|
| 9,646,435 | B2 | 5/2017 | Outwater et al. |
| 9,710,977 | B2 | 7/2017 | Blumer et al. |
| 10,534,968 | B1 * | 1/2020 | Clauss ................. G06K 9/6215 |
| 2009/0152346 | A1 | 6/2009 | Granruth et al. |
| 2013/0345896 | A1 | 12/2013 | Blumer et al. |
| 2015/0134427 | A1 * | 5/2015 | Borras ............... G06Q 30/0284 |
| | | | 705/13 |
| 2016/0247153 | A1 | 8/2016 | Leseky et al. |
| 2016/0307185 | A1 * | 10/2016 | Betancourt ............ G06Q 20/40 |
| 2016/0321665 | A1 | 11/2016 | Thomas et al. |
| 2017/0109391 | A1 * | 4/2017 | Rosen ................... G06F 16/285 |
| 2018/0225749 | A1 * | 8/2018 | Shoen ................ G06Q 30/0645 |
| 2019/0095877 | A1 * | 3/2019 | Li .......................... G06Q 10/20 |

FOREIGN PATENT DOCUMENTS

| | | |
|---|---|---|
| KR | 10-2014-0137059 | 12/2014 |
| WO | 2013040169 A1 | 3/2013 |
| WO | 2016108165 A1 | 7/2016 |

OTHER PUBLICATIONS

Security and privacy of location-based services for in-vehicle device systems; 2014 International Conference on High Performance Computing & Simulation (HPCS) (pp. 841-848); Marcello Missiroli, Fabio Pierazzi, Michele Colajanni, Jul. 21, 2014 (Year: 2014).*
International Search Report and Written Opinion dated Nov. 25, 2018 from PCT/IL2018/050729, pp. 7.
International Preliminary Report on Patentability dated Nov. 13, 2019 from PCT/IL2018/050729, pp. 9.
Extended European Search Report dated Jan. 15, 2021 from EP App. No. 18827871.7 (11 pages).
Office Action dated Jan. 2, 2021 from IL App. No. 253825 (5 pages).
Office Action dated Aug. 27, 2021 from IL App. No. 253825 (3 pages).

* cited by examiner

VEHICLE REFUELING AUTHENTICATION SYSTEM

CROSS REFERENCE TO RELATED APPLICATION

This Application is a U.S. National Phase Application of International Application No. PCT/IL2018/050729, filed on Jul. 4, 2018, which claims the priority to the Israel Patent Application No. 253321, filed on Jul. 5, 2017, and to the Israel Patent Application No. 253825, filed on Aug. 3, 2017, the entirety of which is incorporated herein by reference.

FIELD OF THE INVENTION

The present invention relates to the field of motorized vehicle refueling. More particularly the invention relates to a system for preventing abuse of fuel accounts and providing tools for commercial usage.

BACKGROUND OF THE INVENTION

Fuel accounts are used by many organizations for managing refueling expenses by allowing the user of a vehicle to refuel without needing to pay for the operation. The main concept behind such accounts is to enable organizations to allow specific predefined authorized person to service a vehicle (whether the vehicle belongs to the organization's vehicle fleet or not), without the need of imposing expenses on the person. Some fuel accounts allow paying for additional services such as car washing, shop items, and maintenance. The obvious business benefit of using fuel accounts is that the vehicle running expenses of an organization is funded thereby, without the need of reimbursing money to the individual users of the vehicles. As a payment method, some organizations use fuel cards, which are associated with the fuel accounts.

While fuel accounts are meant to be used for paying for services supplied to specific predefined vehicles, one can abusively take advantage of such accounts and supply fuel to a vehicle other than that which was intended by the organization. Another method of abuse is transferring a fuel card to a third party, whether as result of an abusive user or theft of the card.

Several solutions currently exist, aiming at mitigating abuse of fleet cards, such as volume restriction, limited number of transactions or services permitted per period of time.

Other systems suggest identification based services, wherein fuel and other services are supplied to a vehicle only when a fuel nozzle is in physical proximity or in full contact with a part of the vehicle, wherein the part of the vehicle comprises an identification apparatus and the fuel dispenser comprises an identifying apparatus.

One drawback of such identification based systems is that an identification apparatus must be installed and coupled to each vehicle that is associated with an organization and in every fuel station offering such a service. This is a time and cost demanding requirement.

It is an object of the present invention to provide a method and system of preventing abuse of fuel accounts and cards that varies from prior art systems and overcomes drawbacks thereof.

Other objects and advantages of this invention will become apparent as the description proceeds.

SUMMARY OF THE INVENTION

The present invention relates to a method for authenticating vehicle service account transactions, in which an odometer of a vehicle is digitally read and during an authentication process the odometer reading is compared to a previous digital reading of the odometer for determining whether the reading relates to an authenticated vehicle and whether the current reading relative to the previous reading justifies servicing the vehicle.

According to an embodiment of the invention, the method comprises: a) activating a designated software application installed in advance on a mobile device of a user; b) digitally reading capturing at least one image of an odometer dashboard of a vehicle using said mobile device; c) analyzing said at least one image of said dashboard for identifying features of the vehicle and for recognizing a current odometer reading; and d) during an authentication process comparing said reading to a previous digital reading of the odometer for determining whether said reading relates to an authenticated vehicle and whether the current reading relative to the previous reading justifies servicing the vehicle.

According to an embodiment of the invention, the service accounted for by the service account is purchasing fueling. According to another embodiment, the service accounted for by the service account is shop items, car washing, periodic maintenance servicing or other service that a vehicle periodically requires. According to yet another embodiment, a service card is associated with the service account and can be used to charge the service account. According to still another embodiment, a designated software application for mobile devices is installed in advance on a mobile device of a user of the vehicle, the software application comprising a virtual cellular credit card allowing secure transactions to be carried out without need for physical cards.

According to an embodiment of the invention, the method comprises a pre-process, in which: a) a fuel issuing party provides geographical locations of gas stations that are planned to utilize authentication services to a provider of authentication services; b) an interface is created between said provider and an authorization system of a service account issuing party; c) an agreement is established between said service account issuing party and a customer, said agreement defining the service acquired by the customer; and d) said customer provides information regarding users and vehicles that are to be permitted to use fueling services to the service account issuing party. According to another embodiment of the invention, the method further comprises supplying the service account issuing party usage reports, reporting data and information that can be of use to the party.

According to another embodiment of the invention, the method comprises an authentication process in which: a) a user enters a gas station with the vehicle, the vehicle having a dashboard with an odometer; b) said user activates a designated software application installed in advance on a mobile device of said user, allowing the provider to identify that the user has entered a gas station; c) said designated software application activates a camera of said mobile device and prompts said user to aim the camera at the dashboard of the vehicle; d) said designated software application captures at least one image of said dashboard and transmits said at least one image to an authentication service provider side server, said server comprising previously recorded images and various data readings of vehicles such as odometer, fuel tank level, engine temperature, motor RPM etc.; e) a software application on said authentication service provider side server activates algorithms suitable for analyzing images and analyzes said at least one image of said dashboard by applying image recognition algorithms and Optical Character Recognition (OCR) on the at least one image for identifying features of the vehicle and for recognizing a current odometer reading; and f) said software application authenticates the vehicle by comparing an analyzed image and current dashboard image and odometer reading of the vehicle to previous analyzed dashboard image and odometer readings of the vehicle;

According to yet another embodiment of the invention, the method further comprises identifying, by said designated software application, the global position of said user and transmitting, by said application, said global position to the authentication service provider side server, said server further comprising previously recorded and stored global positions and previously recorded odometer readings of vehicles; wherein the authentication of the vehicle is further determined according to a comparison result between the current location of the vehicle and locations of gas stations. According to another embodiment, the method further comprises authorizing the transaction by the service account issuing party, by detecting that the transaction is associated with the authentication service provider, contacting said provider and receiving an authorization from said provider that the transaction is valid; and charging the service account for the servicing.

According to still another embodiment of the invention, the time and distance between the present location of the vehicle and the previous recorded location at which the vehicle was serviced is calculated and compared to the difference between the analyzed current odometer reading and the previous analyzed odometer reading.

According to an embodiment of the invention, the method further comprises issuing, by the authentication service provider side server, a one-time Personal Identification Number (PIN) for the user to use in order to service the vehicle, the PIN in turn authenticated by the issuing party during the transaction authorization. According to another embodiment, the method further comprises supplying the service account issuing party usage reports, reporting data and information that can be of use to the party.

According to yet another embodiment of the invention, the method further comprises generating a user's profile including data and information associated with recorded transactions of the user. According to still another embodiment, the user's profile is used for loyalty activities and cross selling with the user via the designated software application.

In another aspect, the present invention relates to a system for authenticating vehicle service account transactions, comprising an imaging device adapted for capturing at least one image of a dashboard of a vehicle; a processing unit for processing said at least one captured image so as to obtain image features and a reading of said odometer and for comparing said image features and said obtained reading to previously recorded image features and reading of said odometer, thereby enabling to identify the vehicle and to determine whether the current reading relative to the previous reading justifies servicing the vehicle; and a gas station authentication unit configured to enable servicing said vehicle whenever receiving data indicating that servicing the vehicle is justified.

DETAILED DESCRIPTION OF THE INVENTION

Reference will now be made to an embodiment of the present invention, examples of which are illustrated in the accompanying figures for purposes of illustration only. One skilled in the art will readily recognize from the following description that alternative embodiments of the structures and methods illustrated herein may be employed, mutatis mutandis, without departing from the principles of the claimed invention.

Several parties and items may participate in the process of authenticating a vehicle requesting service:
1. Fuel account/card issuing parties;
2. Fuel supplying parties;
3. Gas stations;
4. An authentication service provider (hereinafter "provider"), for providing authentication services;
5. A customer, e.g. an organization wishing to provide fuel accounts and/or cards to individual users (i.e. employees, partners etc.);
6. A user who is an individual with whom a fuel account is associated;
7. A vehicle associated with the fuel account; and
8. A designated software application for mobile devices to be used by the users for the purpose of authentications and additional services.

Figure 1:
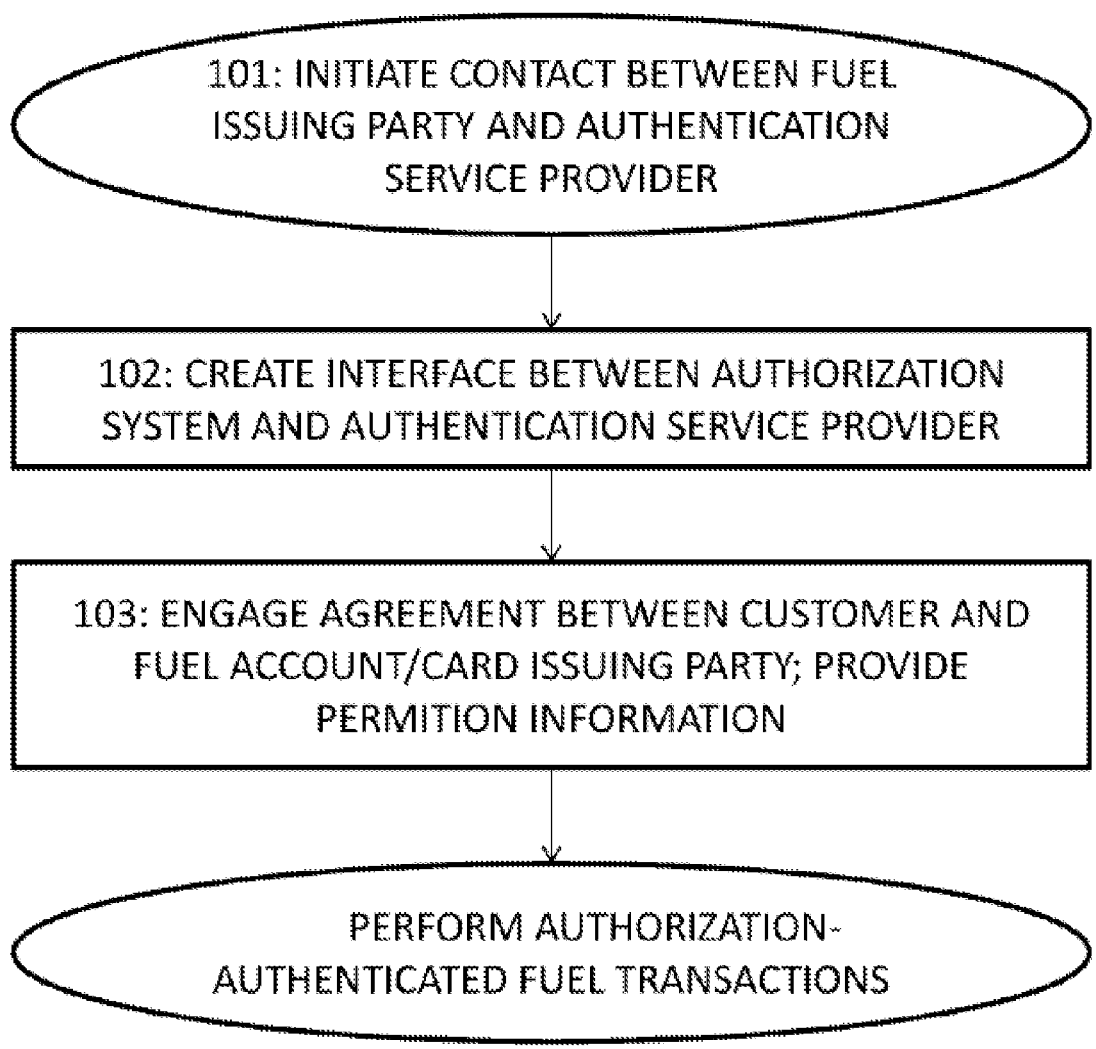
FIG. 1 is a flowchart describing a pre-process carried out before authenticating a vehicle, according to an embodiment of the invention.

According to an embodiment of the invention, a pre-process is performed before a user may refuel his vehicle. FIG. 1 is a flowchart describing the pre-process according to an embodiment of the invention. At the first stage 101 a fuel issuing party contacts the provider for acquiring authentication services. The fuel issuing party provides the provider exact geographical locations of each of the gas stations that are planned to utilize authentication services and other relevant information.

At the next stage 102, an interface between an authorization system of the fuel account/card issuing party and the provider is created. The interface allows applying the additional security layer by the provider to the fuel account/card issuing party.

At the next stage 103, a customer establishes an agreement with the fuel account/card issuing party so as to purchase fuel (and possibly other services the issuing party has to offer) therefrom. During the engagement the customer provides the fuel account/card issuing party information regarding users and vehicles that are to be permitted to use fueling services. The information can be chosen from, but is not limited to, a group comprising:

The license plate number of each vehicle;
The name of each user;
The mobile phone number of each user;
The model of each vehicle;
The type of fuel suitable for each vehicle;
Specific limitations such as specific allowed gas station location, quantity limits and more.
The current reading of the odometer (mileage) of each vehicle; or
Two or more of the above.

Obviously, parts of the above process are not required in case of previously existing customers of the fuel account/card issuing party.

Once the fuel account/card issuing party has acquired all the above information, a fuel account or a fuel card is issued for each user/vehicle. The Customer distributes the fuel accounts/cards to the users and instructs them to download the software Application and to enter the needed information. Fuel transactions may be performed within the fuel account/card line of credit and per the terms of the agreement between the parties.

In order to install and use the software application, a user is required to perform an Application Installation Process that may involve the following:

1. A user logs into an online mobile application reservoir (e.g. app store by Apple Inc.) and downloads the software application to a mobile device;
2. The user installs the software application on the mobile device;
3. Once the installation is complete, the user runs the application;
4. The user is asked to enter personal information;
5. The user is asked to add the phone number of additional allowed users of the vehicle such as family members;
6. The user is asked to provide a unique identification associated with a fueling account by entering the user's fueling card number, photocopy it and/or providing any other account number provided to the user by the fuel account/card issuing party;
7. (In some embodiments of the invention) The user is requested to enter the vehicle number;
8. The vehicle camera is automatically activated, and the user is asked to orient the device towards the dashboard when the vehicle's motor is on;
9. The application performs advanced image analysis, studies and saves the image and data (odometer, fuel gauge, engine heat, external temperature, position and other indicator lights);
10. The application informs the user that the registration has been successfully completed and that the user is entitled to refuel the vehicle; and
11. The application transfers the relevant data to the Provider.

In some embodiments of the invention, a Unique Identifying Device (UID), such as radio-frequency identification (RFID) sticker or other similar item, can be used as identification means of the vehicle. For example, the UID can be installed on the dash board of the vehicle.

Figure 2:
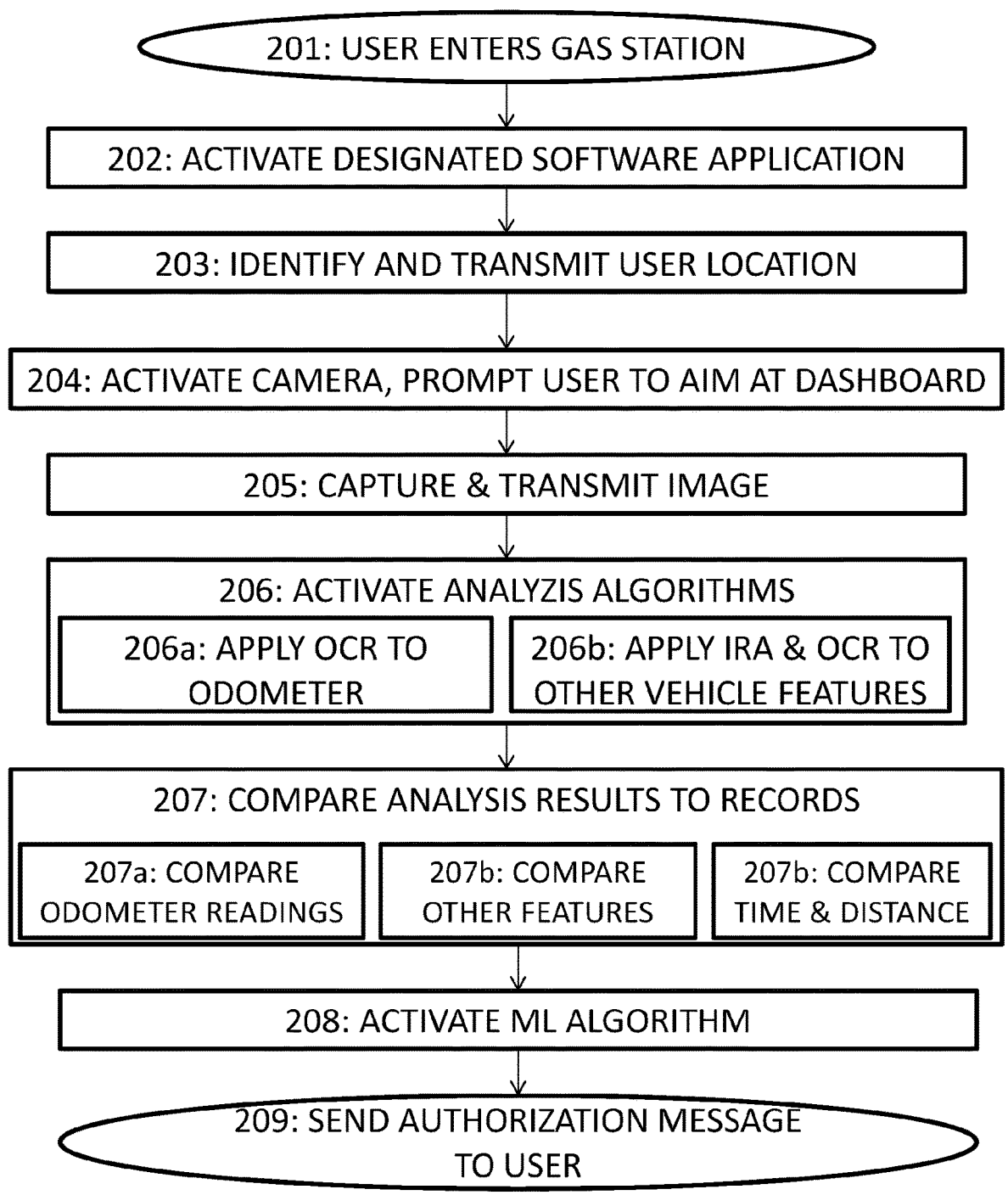
FIG. 2 is a flowchart describing a process of authentication according to an embodiment of the invention.

FIG. 2 is a flowchart describing a process of authentication according to an embodiment of the invention. At the first stage 201 a user enters one of the gas stations, the location of which was provided by the fuel issuing party in step 101 of the pre-process illustrated in FIG. 1. At the next stage 202 the user wishing to service his vehicle activates the software application on the user's mobile device, the number of which was registered during stage 103 of the pre-process illustrated in FIG. 1. At the next stage 203 the software application identifies the global position of the user from a positioning element (e.g. GPS) embedded within the mobile device, and the global position is transmitted to a provider side server. At the next stage 204 a camera of the mobile device is activated by the software application, and the user is prompted to aim the camera at the dashboard of the vehicle. At the next stage 205 an image is captured and transmitted to the provider side server. At the next stage 206 a software application running on the provider side server activates algorithms suitable for analyzing the image received from the mobile device, the analysis comprising Optical Character Recognition (OCR) (stage 206*a*) of the vehicle's odometer so as to recognize the current odometer reading and IRA (Image Recognition algorithm) and OCR (stage 206*b*) of other features of the vehicle that can be recognized from the image, such as geometrical shape and color of the dashboard, fuel gauge location and indication, motor temperature indication, the model of the vehicle, various indicator light status, the UID when applicable, etc.

According to an embodiment of the invention stage 206 (including stages 206*a* and 206*b*) are performed by the user's mobile device by suitable image analysis algorithms stored thereon and activated thereby or by the provider side server.

Next, at stage 207, an authentication process is performed in which the analyzed information and data is compared to previously analyzed and recorded information and data for the sake of validation. At stage 207*a* a provider side software application compares the current odometer reading to previously recorded (and stored) odometer readings, especially to the last recorded odometer reading. At stage 207*b* a provider side software application compares the analyzed other features to previously recorded (and stored in a local memory unit that is coupled to the provider side server) other features of the vehicle in order to authenticate the vehicle (such as the image structure, personal elements, UID, other indicator states, etc.). At stage 207*c* the time and distance between the present time and location of the vehicle and the previous recorded time and location at which the vehicle was serviced is calculated. Other parameters that can be authenticated in stage 207 include, for instance, the vehicle's fuel consumption and/or the ambient temperature.

After receiving results from stages 207*a*-207*c*, at stage 208 the provider side server activates a decision making (ML-machine learning) algorithm suitable to decide, based on the results, whether or not to authorize the transaction. At stage 209 an authorization message is sent to the user who is now able to service the vehicle on account of the fuel account/card.

After the transaction is authorized, the vehicle may be serviced (e.g. refueled), after which the fuel card/account issuing party verifies the validity of the transaction by detecting that the vehicle is associated with the service provider, contacting the provider and receiving an authorization from the provider that the transaction is valid according to the abovementioned criteria. At this point the transaction is authorized and the user may charge the fuel account/card for the service received (i.e. the fuel purchased). In case a physical fuel card is provided, the user may now safely use the card. Some fuel stations require that the transaction be approved prior to the refueling process. In such cases, after the transaction is authorized, the user asks for approval to refuel by applying the user's card to the payment terminal. The fuel card/account issuing party verifies the validity of the transaction by detecting that the vehicle is associated with the service provider, contacting the provider and receiving an authorization from the provider that the transaction is valid according to the abovementioned criteria. At this point the transaction is authorized and the user may refuel the vehicle. Once done, the fuel account/card is charges by the fuel account/card issuing party.

According to an embodiment of the invention, the user will have to provide the identification of a specific gas pump the user wishes to use. After the user provides the identification of the pump (e.g., by entering the pump number via the mobile application), the provider server is enabling the specific pump by sending the relevant information to the fuel account/card issuer and all the way to the gas station specific pump. The pump will be enabled for a predefined time allowing the refueling of the vehicle. At the end of the refueling, a charging process may apply (e.g., via the terminal at the gas station) by using the user's fuel card, by using the application installed in the mobile device, or by automatically applying the charging without using any additional device or transaction procedure.

According to an embodiment of the invention, after the completion of the payment transaction the fuel card/account issuing party will transfer to the Provider the fundamentals of transaction (liters consumed, shop items, date, time etc.) This information can be analyzed and will be added to the profiling parameters of the user.

In case a fuel account exists without a physical card, the designated software application introduces a virtual cellular credit card allowing secure transactions to be carried out without need for physical cards, for instance using NFC protocol. The virtual cellular credit card will be active for a predefined period of time between the transaction authorization and the payment. If during the activation period the software application detects that the user's location changes, the virtual credit card will be disabled and will cancel the authorization and the transaction.

Although a transaction may be carried out fully according to the process illustrated in FIG. 2, additional stages may be performed. For example the designated software application installed in advance on the user's mobile device may further comprise navigational algorithms suitable to provide a navigation route from a user's current location to a gas station, and therefore before stage 201 a user may activate the designated software application that in turn provides the user a navigation route to a gas station Another exemplary additional stage comprises issuing, by the provider side server, a one-time Personal Identification Number (PIN) for the user to use in order to service the vehicle. The PIN is in turn authenticated by the issuing party during the transaction authorization process.

According to an embodiment of the invention, the provider records and stores the transaction data to a local database for further reference. In addition the data can be associated with the user who performed the transaction. The information can, for instance, be used for:

supplying the customer management reports of user's usage and consumption features;
generating a user's profile; and/or
operating a commercial interface with the issuing party for loyalty activities and cross selling with the user via the mobile device software application based on the GPS location and in correlation to the fuel station offer.

According to another embodiment of the invention, the provider supplies the fuel card/account issuing party usage reports, reporting data and information to be sent and used by the customer. The information can be selected from, but is not limited to, the following group:

Odometer report for tracking maintenance and comparing to work programs or usage approval;
Average fuel consumption per vehicle and/or per user;
Various notifications;
Geographical use analysis; and/or
Platform to communicate with the users.

According to yet another embodiment of the invention, after stage 209 the Provider runs a Marketing campaign management process, based on the location of the user and his personal profile enabling the fuel card/account issuer to send him (communicate with him) marketing/loyalty targeted offers, using the application on the mobile device and while the user is still in the gas station.

It is noted that although FIGS. 1 and 2 illustrate a case in which a user possesses a fuel card or a fuel account suitable for refueling a vehicle, the present invention is not limited to the authentication services acquired from the provider. The services can comprise, for instance, car washing, periodic maintenance servicing or any other service that a vehicle periodically requires, which a customer may wish to securely allow users to benefit from.

It is further noted that although stage 206 in FIG. 2 was described as identifying the current mileage on the odometer and other reading values (e.g. fuel gauge indication), it is obvious that image recognition algorithms can be applied to other features of the indicators, such as the font and color in which the readings are presented, the location of the indicators within the image, etc. comparing these analyzed features to similar previously recorded features can help in authenticating a vehicle requesting service.

Although embodiments of the invention have been described by way of illustration, it will be understood that the invention may be carried out with many variations, modifications, and adaptations, without exceeding the scope of the claims.

The invention claimed is:

1. A method for authenticating vehicle service account transactions, comprising:
   a) performing a pre-process that includes the following tasks:
      i) providing geographical locations of gas stations that are planned to utilize authentication services to a provider of authentication services;
      ii) creating an interface between said provider and an authorization system of a service account issuing party;
      iii) establishing an agreement between said service account issuing party and a customer, said agreement defining the service acquired by the customer; and
      iv) providing information regarding users and vehicles that are to be permitted to use fueling services to the service account issuing party;
   b) activating a designated software application installed in advance on a mobile device of a user;
   c) upon activating the designated software application, allowing the provider of authentication services to identify that said user has entered a gas station with a vehicle;
   d) activating a camera of said mobile device for capturing at least one image of a dashboard of said vehicle;
   e) capturing at least one image of a dashboard of a vehicle using said mobile device;
   f) transmitting said at least one image to an authentication service provider side server, wherein said server comprises previously recorded dashboard images and various data readings of vehicles that at least include previously recorded odometer readings;
   g) analyzing said at least one image of said dashboard by applying image recognition algorithm(s) and Optical Character Recognition (OCR) on the at least one image to identify features of the vehicle and to recognize a current odometer reading;
   h) authenticating the vehicle by comparing said identified features of the image of said dashboard to features of the previously recorded dashboard images; and nu comparing the current odometer reading to a previous recorded odometer reading to determine whether said current odometer reading relates to the authenticated vehicle, wherein the comparison involves one or more parameters associated with said authenticated vehicle, wherein at least one of said parameters is the vehicle's fuel consumption, thereby determining whether the current odometer reading relative to the previously recorded odometer reading justifies servicing the vehicle; and i) identifying, by the designated software application, the global position of said user and transmitting, by said application, said global position to the authentication service provider side server, said server further comprising previously recorded and stored global positions and previously recorded odometer readings of vehicles, wherein the authentication of the vehicle is further determined according to a comparison result between the current location of the vehicle and locations of gas stations, and wherein the time and distance between the current location of the vehicle and the previous recorded location at which the vehicle was serviced is calculated and compared to the difference between the current odometer reading and the previous odometer reading.

2. The method according to claim 1, further comprising:
a. authorizing the transaction by the service account issuing party, by detecting that the transaction is associated with the authentication service provider, contacting said provider and receiving an authorization from said provider that the transaction is valid; and
b. charging the service account for the servicing.

3. The method according to claim 2, further comprising issuing, by the authentication service provider side server, a one-time Personal Identification Number (PIN) for the user to use in order to service the vehicle, the PIN in turn authenticated by the issuing party during the transaction authorization.

4. The method according to claim 1, wherein the service accounted for by the service account is purchasing fueling.

5. The method according to claim 1, wherein the service accounted for by the service account is shop items, car washing, periodic maintenance servicing or other service that a vehicle periodically requires.

6. The method according to claim 1, wherein a service card associated with the service account is configured to charge the service account.

7. The method according to claim 1, wherein a designated software application for mobile devices is installed in advance on a mobile device of a user of the vehicle, the software application comprising a virtual cellular credit card allowing secure transactions to be carried out without need for physical cards.

8. The method according to claim 1, wherein a designated software application for mobile devices is installed in advance on a mobile device of a user of the vehicle, the software application comprising navigational algorithms configured to provide a navigation route from a user's current location to a gas station.

9. The method according to claim 1, further comprising supplying the service account issuing party usage reports.

10. The method according to claim 1, further comprising generating a user's profile including data and information associated with recorded transactions of the user.

11. The method according to claim 10, wherein the user's profile is associated with loyalty activities and cross selling with the user via the designated software application.

12. The method according to claim 1, wherein the identified features of the image of said dashboard are obtained by using a deep learning algorithm.

* * * * *